June 12, 1956      C. J. VAN DALEN      2,750,548
ELECTRONICALLY CONTROLLED SYNCHRONOUS ELECTROMOTOR
Filed March 2, 1953      4 Sheets-Sheet 1

INVENTOR.
CHRISTIAAN JOHANNES VAN DALEN
BY
ATTORNEY

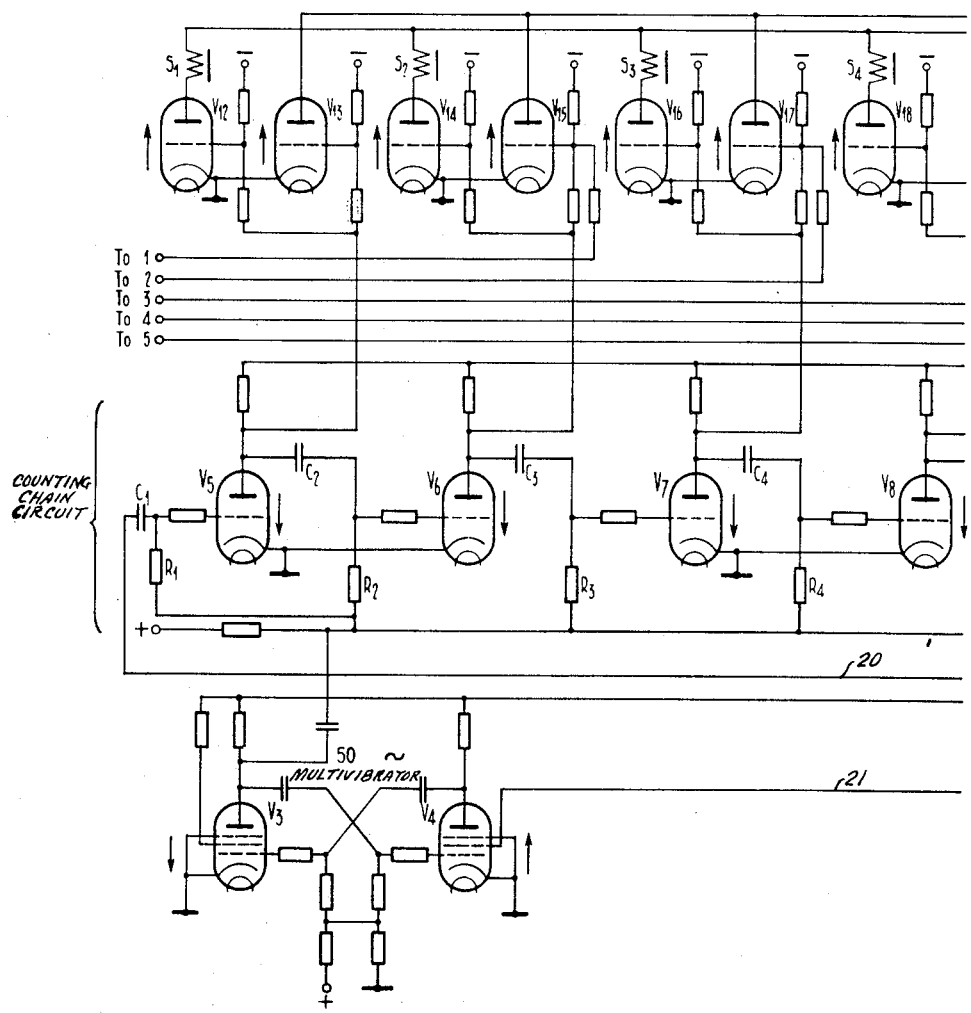
FIG. 2
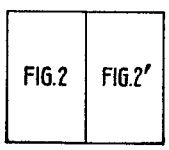
INVENTOR.
CHRISTIAAN JOHANNES VAN DALEN

INVENTOR.
CHRISTIAAN JOHANNES VAN DALEN
BY
ATTORNEY

United States Patent Office 2,750,548
Patented June 12, 1956

2,750,548

ELECTRONICALLY CONTROLLED SYNCHRO-
NOUS ELECTROMOTOR

Christiaan Johannes Van Dalen, The Hague, Nether-
lands, assignor to Staatsbedrijf der Posterijen, Tele-
grafie en Telefonie, The Hague, Netherlands Application March 2, 1953, Serial No. 339,721

Claims priority, application Netherlands, March 6, 1952

18 Claims. (Cl. 318—162)

This invention relates to an electrically controlled step-by-step electric synchronous motor. More particularly, it deals with such an electric motor which rotates successive equal predetermined angular intervals corresponding to each one of a series of successive pulses from an electronic control circuit. Such a motor and its electronic control circuit may readily be adapted for operating a motor selector, a counter, a transmitter-distributor, a telegraph printer, a computer, or the like.

It is an object of this invention to produce a simple, efficient, effective and economic step-by-step electronically controlled electric synchronous motor.

Another object is to produce such a motor which may be easily reversed in its direction of rotation and/or change its phase of operation.

Another object is to produce such a motor adapted for successively and rapidly detecting and transmitting binary multi-element telegraph code signals from a perforated tape or punched strip in which the successive detection of the signal elements recorded on the tape are in synchronism with the feeding of the tape.

Another object is to produce a telegraph tape reader or keyer and transmitter device in which the detection of the elements recorded on the tape is sequentially in synchronism with their transmission and the feeding of the tape through the keyer.

Another object is to produce such a tape reader in which the detector or reader fingers are not continuously applied to or riding against the surface of the tape, but are only pressed towards the tape when their corresponding signal elements are to be detected for transmission, conversion, or the like.

Generally speaking, the apparatus of this invention comprises an electric synchronous motor having a stator of a plurality of separate spaced electromagnets and a rotor of a plurality of equally spaced electromagnet pole responsive elements arranged at a different pitch than said electromagnets of said stator, and an electronic pulse control circuit for successively energizing the electromagnets of said stator to rotate said rotor a given angular distance corresponding to each successive pulse.

The number of electromagnets in the stator must be at least three, and the number of electromagnet pole responsive elements, bars or teeth on the rotor may be equal to, less than, or greater than the number of said stator electromagnets. However, the number of said pole responsive elements times the number of said electromagnets in the stator equals the number of steps or successive pulses required to produce one complete rotation of 360° of said rotor with respect to said stator.

The electronic control circuit for controlling the movement of the step-by-step motor comprises an electronic distributor circuit including a counting chain of electron discharge tubes which may be respectively connected to control the separate energization of each one of the coils of the electromagnets in the stator of the motor, so that as each electron tube in the distributor is successively and separately operated, the corresponding electromagnet in the stator will be energized to move or rotate the rotor of the motor one step. The operation of the distributor circuit may include a multivibrator circuit, a trigger circuit, or both, whereby pulses may be generated and employed for controlling the successive operation of the counting chain circuit.

In a specific case for adapting the above motor and its control circuit for reading the transmitting telegraph signals recorded on a perforated strip or tape, both a trigger circuit and a multivibrator circuit may be employed for controlling the counting chain of the distributor. A pair of additional electron tubes also may be provided for each stage or tube of the counting chain, one tube of each pair being employed for controlling a transmitting relay in accordance with the binary indications recorded on the tape in synchronism with the counting chain operations; and the other tube of each pair being employed for energizing the electromagnets of the stator. This synchronism is insured by mechanically connecting the rotor of the motor with a gear or toothed wheel which fits into a series of regularly spaced and aligned feeding holes or perforations in the strip or tape. The number of electron tubes or stages in the counting chain and the number of electromagnets in the stator may correspond to the number of elements in each code signal to be transmitted. After each separate signal has been read and transmitted, additional means may be provided on the rotor, and/or in the electronic distributor or control circuit for stopping the multivibrator at the end of each signal, and then for starting it again when the next succeeding signal on the tape is in position for detection and transmission.

If the code signals on the tape are recorded as perforations, separate feelers or fingers may be provided for each element of the recorded signals to scan the strip or tape to detect at given points the presence or absence of such perforations. In order to prevent undue wear or tearing of the tape by these feelers or fingers, separate electromagnetic means may be provided for each feeler or finger for moving it into detecting position only when that particular element of the code is to be detected or transmitted in synchronism with the transmitting of that element. If desired, the movement of the finger or feeler may be operated during two consecutive adjacent element positions to insure complete detection of the recorded signal element on the tape.

The above mentioned and other features and objects of this invention and the manner of attaining them are given more specific disclosure in the following description of embodiments of the invention taken in conjunction with the accompanying drawings, wherein:

Fig. 1 is a schematic diagram of one embodiment of a step-by-step synchronous motor in accordance with this invention, showing the relative positions of the stator electromagnets and the rotor electromagnet pole responsive elements for a 56 step rotation of the rotor, and how the rotor may be connected for feeding a telegraph code perforated tape;

Figs. 2 and 2' together show a schematic wiring diagram of an electronic control circuit for a step-by-step motor of the type shown in Fig. 1 adapted for the transmission of telegraph code signals;

Fig. 5 is a schematic diagram similar to that shown in

3

Figure 4:
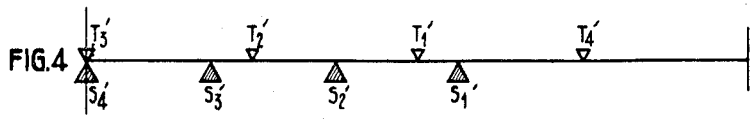
Fig. 4 is a straightened schematic diagram of the relative locations of the electromagnets of a stator to the pole responsive elements of a rotor for a 16 step rotation of the rotor.
Figure 5:
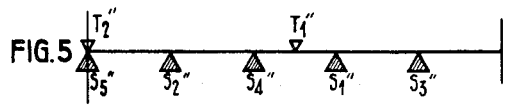
Figure 6:
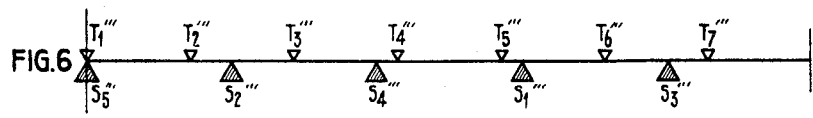
Figure 7:
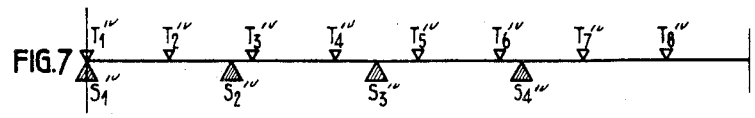
Figures 2, 3:
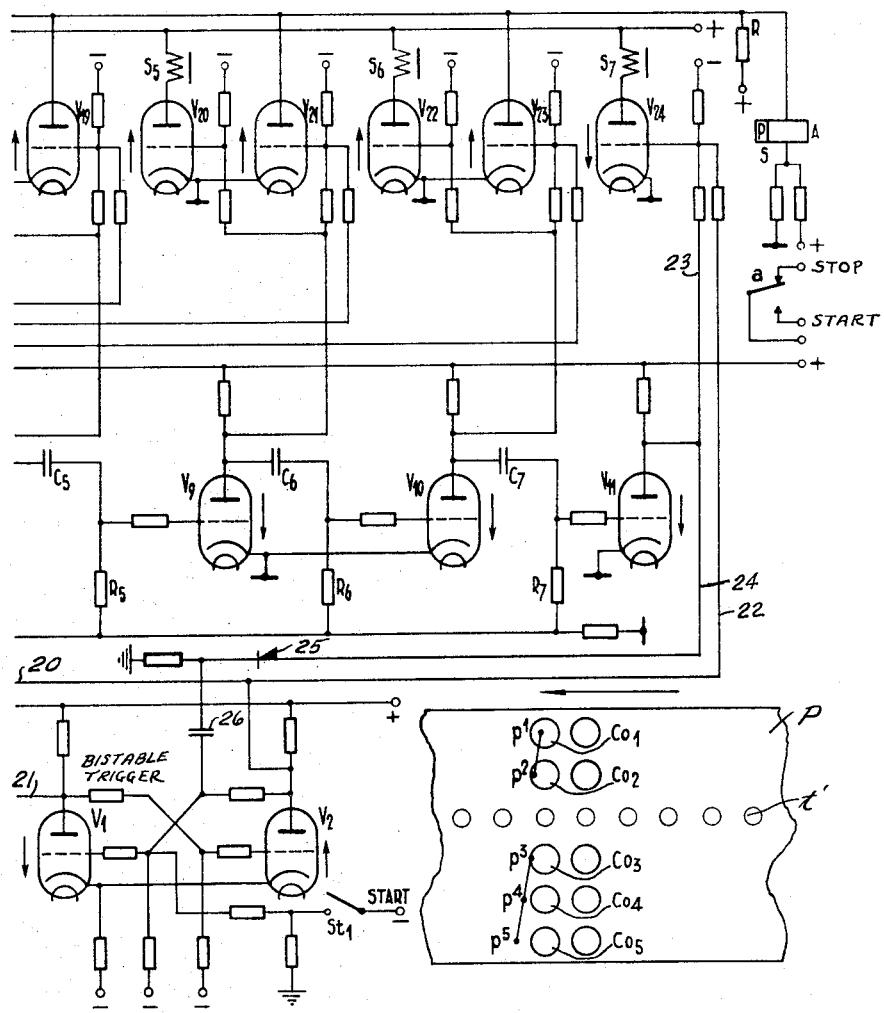
Fig. 3 shows a section of telegraphic code tape or strip indicating the relative locations of the perforations corresponding to the signal elements for a five unit telegraph binary code, and the relative positions of the feelers for detecting said perforations.
Figure 8A:
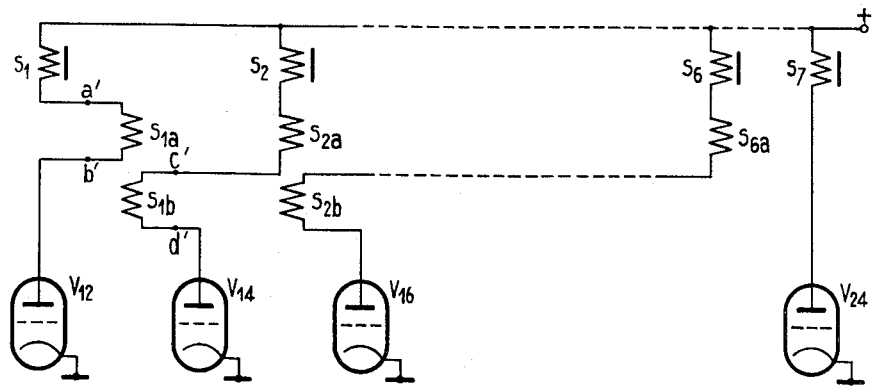
Figure 8B:
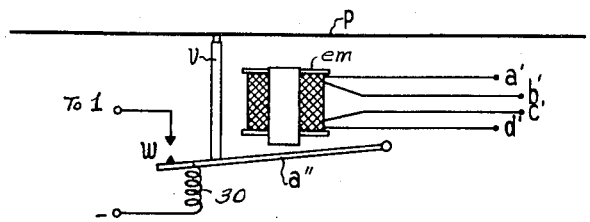

Fig. 4 for the relative locations of the parts of a stator and rotor which provide a 10 step rotation of the rotor;

Fig. 6 is a schematic diagram similar to that shown in Fig. 4 or 5 for a motor which provides a 35 step rotation of the rotor;

Fig. 7 is a schematic diagram similar to that shown in Fig. 4, 5 or 6 for a motor which provides a 32 step rotation of the rotor;

Fig. 8a is a schematic wiring diagram of a modified part of the circuit shown in Figs. 2 and 2' showing additional operating electromagnetic coils in the output circuits of the final electron tubes of the distributor for operating the tape feelers or fingers for the tape only during the times a corresponding element of the signal is being transmitted; and Fig. 8b is a schematic diagram of a tape reader including a feeler or finger for detecting perforations corresponding to one element of a telegraph signal recorded on a tape similar to that shown in Fig. 3, including an electromagnetic coil operating device for such a feeler, which coil may be controlled according to the modified circuit shown in Fig. 8a.

I—The Motor

Figure 1:
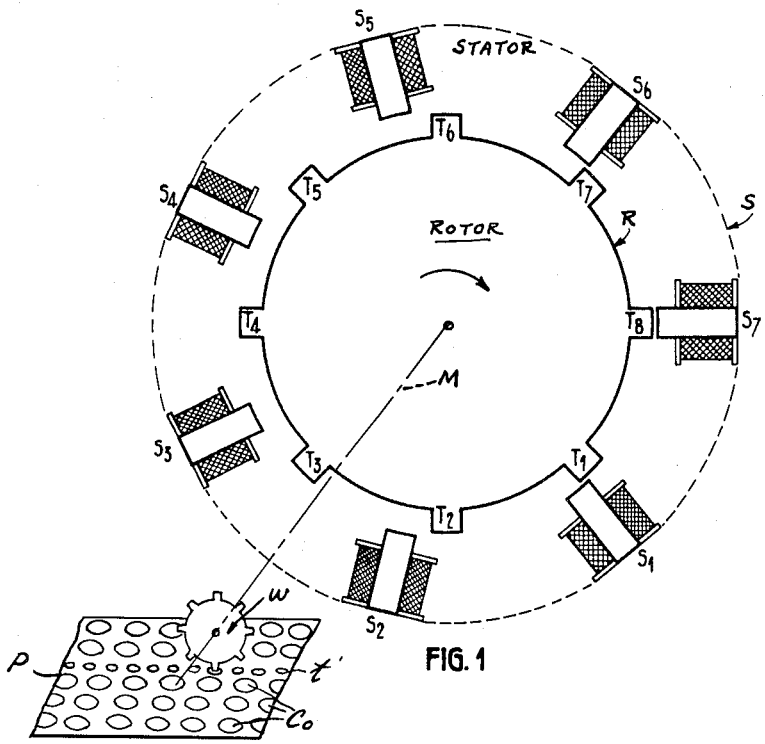

Referring to Fig. 1 there is shown schematically a motor having a circular stator S comprising equally spaced circumferentially there around 7 equal electromagnets S1 through S7 with their respective poles aligned radially toward the axis of the motor. Inside the stator S is disclosed a rotor R upon which are mounted 8 equally spaced pole responsive elements or teeth T1 through T8, which successively may cooperate with the poles of the electromagnets S1—S8 in the stator; tooth T8 being aligned with the pole of electromagnet S7 indicating that the electromagnet is, or was the last to be, energized. The rotor R is mounted on a shaft M, schematically shown as a dotted line, onto which shaft may be mounted a tape driving or feeding wheel W which may be provided with teeth $t$ that may engage a series of equally spaced apertures $t'$ along a punched strip or perforated telegraphic type code tape P, for moving said code tape in direct and positive synchronism with the step-by-step rotation of the motor rotor R. This tape feeding wheel W is particularly adapted for the use of the step-by-step synchronous motor of this invention in cooperation with a telegraphic code keyer or reader and transmitter, the circuits for which are disclosed in Figs. 2, 2', 3, 8a and 8b.

Referring to the stator S, the successive energization of the electromagnets S1—S7 in accordance with successive pulses from the electronic control circuit of Figs. 2 and 2', causes the teeth T1—T8 to successively align with the poles of these electromagnets, so that one cycle of energization of the electromagnets S1—S7 will cause the rotor R to be rotated one eighth of a complete rotation or 45°. At the end of this first cycle the tooth T7 will then be aligned with the pole of the electromagnet S7. Accordingly, for one complete rotation of the rotor R with respect to the stator S, the electromagnets S1 through S7 will have to be successively energized eight times, corresponding to 7×8 or 56 separate successive steps or impulses from the electronic control circuit.

If different numbers of steps or impulses are desired to make one complete rotation of a rotor, different combinations of differently pitched electromagnetic stator poles, and equally spaced rotor teeth may be provided. Although, the minimum number of stator electromagnets for a step-by-step motor of this type is 3, the number of teeth on the rotor may be either equal to this number, as shown diagrammatically in Fig. 4, less than this number as shown diagrammatically in Fig. 5, or more than this number as shown in Figs. 1, 6 and 7. In any event, however, the number of pulses to produce a complete rotation of the rotor with respect to the stator is equal to the number of electromagnets in the stator times the number of teeth on the rotor. Accordingly: in Fig. 4, 4×4=16 pulses or steps are required for one complete rotation of a motor; in Fig. 5, 2×5=10 pulses or steps are required; in Fig. 6, 7×5=35 pulses or steps are required; and in Fig. 7, 8×4=32 pulses or steps are required.

The relative order of energization of the electromagnets S'1—S'4 to their teeth T'1—T'4 on the rotor of Fig. 4 is not shown to be in the same order as that shown for the order of energization of the electromagnets S''1—S''5 of Fig. 5 and S'''1—S'''5 shown in Fig. 6 with respect to their teeth. However, the energization is in a given or predetermined cyclic pattern or sequence so that the tooth of the rotor next closest to the pole of an electromagnet in a given direction corresponds to the electromagnet that is the next in the cycle to be operated for continued forward rotation of the rotor. Thus the number following the reference characters of the electromagnets S1—S7, S'1—S'4, S''1—S''5, S'''1—S'''5 and S$^{iv}$1—S$^{iv}$4 in Figs. 1, 4, 5, 6 and 7 on the drawing, respectively, are in numerical sequence corresponding to their order of cyclic energization for effecting continuous rotation of their corresponding rotors in one direction, if an infinite series of pulses are successively applied to said electromagnets.

If the cycle of energization of the electromagnets of any one of the combinations shown in Figs. 1, 4, 5, 6 and 7 is reversed, the rotor likewise will be reversed, and correspondingly the phase of the rotor may be changed by controlling the order of energization and/or time of energization of these stator electromagnets.

II—The control circuit

For the purpose of illustration, a control circuit adapted for the seven electromagnets of the stator S shown for the motor in Fig. 1, is illustrated in Figs. 2 and 2', together with a specific application of this control circuit for the transmission of a seven element binary code signal from a five element telegraph or Baudot code signal recorded by perforations or the absence of perforations on a strip or tape P as shown in Figs. 1 and 3.

Referring to Figs. 2 and 2' generally, there is shown at the lower right of the circuit in Fig. 2' a starting switch St1 which when closed, even instantaneously operates a bistable trigger circuit comprising an interconnected pair of electron tubes V1 and V2. This trigger circuit may in turn start a multivibrator circuit of electron tubes V3 and V4 shown at the bottom of Fig. 2, which in turn may supply a continuous sequence of pulses, until it is shut off, at any given rate depending upon the time constant of the multivibrator circuit, say for example 50 cycles per second. Connected to this multivibrator circuit extending across the center of Figs. 2 and 2' are a series of vacuum tubes V5—V11 connected to form an electronic counting chain with time constant circuits between them that are triggered by successive pulses from the multivibrator circuit of tubes V3 and V4. Thus, the multivibrator synchronizes the successive operations or energization of the distributor counting chain of electron tubes V5—V11.

Although the outputs of a counting chain might be employed directly to energize the respective coils S1—S7 of the stator of the motor, in the particular adaptation of the circuit shown in Figs. 2 and and 2' these counting chain tubes are all shown normally conductive and therefore additional control electron tubes V12, V14, V16, V18, V20, V22 and V24 are needed to separately energize the coils of the electromagnets S1—S7. In this example in order to synchronize the transmission of the telegraph signals with the operation of the motor, further electron control tubes V15, V17, V19, V21 and V23 may also be connected to the output of each counting chain tube to control the transmitting relay A (see the right side of Fig. 2') sequentially in accordance with the detection of the five telegraphic signal elements recorded on the tape P. (This detection may be accomplished by separate feelers or fingers, such as $v$ (see Fig. 8b) operated in sequence at positions $p1$ through $p5$ (see Fig. 3), connected respectively to the terminals To1—To5 described in part III later). The first odd numbered control tube V13 controls the formation of start and stop elements at the beginning and end of each series of five intelligent elements to be transmitted by the relay A.

In order to describe the operation of the circuit in Figs. 2 and 2', let it be assumed that the starting switch S$t$1 is momentarily closed, or a negative potential pulse is applied to the grid of the tube V1 of the bistable trigger circuit causing the normally conductive condition of this tube to be stopped, which in turn permits a more positive pulse to be transmitted via conductor 21 to the screen grid of a pentode tube V4 of the multivibrator circuit shown in Fig. 2, which starts this multivibrator circuit oscillating, alternately causing pentode tubes V3 and V4 to become conductive and non-conductive as long as the tube V1 remains cut off. The cutoff of tube V1 of the bistable trigger circuit also causes the tube V2 whose grid is also connected to the output of tube V1, to become more positive and become conductive so that a more negative potential is applied both via conductor 20 to the first time constant circuit C1—R1 for the first counting chain electron tube V5, and via conductor 22 to the grid of the last of the additional or control electron tubes V24 causing the tube V24 to cut off and deenergize the coil of electromagnet S7 in the stator of the motor readying the electromagnets of the stator S for sequential energization to permit the movement of the tooth T8 away from the pole of the electromagnet S7 as shown in Fig. 1.

Since the counting or distributor tubes V5—V11 are normally conductive, the more negative potential applied to the grid of tube V5, through time constant circuit of condenser C1 and resistor R1, will initially cut off the tube V5, but because of the build up in this time constant circuit C1—R1 timed by a synchronization pulse from the output of the pentode tube V3 of the multivibrator, the tube V5 will again become conductive so as to cause the potential on the grid of the tube V6 through the next time constant circuit of condenser C2 and resistor R2 to rise and be cut off until fired again in synchronism by the following pulse from the multivibrator circuit from the output of pentode tube V3. Thus, sequentially each of the counting chain tubes V5 through V11 are separately and consecutively cut off in synchronism with the pulses from the multivibrator circuit of tubes V3 and V4.

Coupled to the outputs of each of the counting chain tubes V5—V11 are the pairs of control tubes V12—V24, the grids of each pair of which are connected in parallel to their said corresponding outputs. Thus, as each of the tubes V5—V11 is successively cut off the corresponding grids of the tubes V12—V24 are made more positive to place them in a condition to become conductive. The even numbered control tubes of V12, V14, V16, etc. are shown directly connected through their anode circuits to the corresponding coils of the electromagnets S1—S8 of the stator, so that as these tubes are successively energized, the electromagnets S1—S8 are correspondingly successively energized and then deenergized to successively rotate the rotor R in increment steps of $\frac{1}{7}$ of 45° of arc for each time an electromagnet is energized.

The outputs or anode circuits of the odd numbered control tubes V13, V15, V17, V19, V21 and V23 are each connected to the terminal R to which is also connected one terminal of the transmitting relay A, the other terminal S' of said relay being connected to an intermediate potential between those normally applied to the terminal R, namely between the higher and lower potentials corresponding respectively to non-conductivity and conductivity of all and one of the odd numbered control tubes V13, V15, V17, V19, V21 and V23 connected to the terminal R. The conductivity or non-conductivity of one of the odd numbered control tubes is determined by the intelligence element to be transmitted by the relay A.

The conductivity of the first control tube V13 is determined by the operation of the counting chain tubes in that it determines the start and stop elements of the seven unit code being transmitted. Accordingly, control tube V13 always becomes conductive when a new cycle of operation of the counting chain V5—V11 is started by the cut-off of tube V5 to transmit a start element by operation of the relay A, and tube V13 remains non-conductive after each cycle of operation of the counting chain to transmit stop elements by maintaining relay A in the position shown in Fig. 2' until a new start is instigated.

The remaining five odd numbered tubes V15, V17, V19, V21 and V23 have their corresponding control grids directly connected to the terminals T$o$1 through T$o$ 5, which herein apply negative or no potential to these grids, corresponding, respectively, to the presence or absence of a perforation in the telegraphic tape P determined by a finger or feeler such as $v$ shown in Fig. 8$b$, described later. Thus, if a more negative potential is applied to the grids of these five odd numbered control tubes during the time the corresponding tubes of their pairs have a positive potential applied to them, this positive potential is more than overcome and the odd numbered tube remains non-conductive, so that the relay A remains in, or moves to, its stop element polarity position. Correspondingly, each of the five odd numbered control tubes are controlled by the absence or presence of a negative potential applied to the terminals T$o$1—T$o$5.

At the end of the cycle when the counting chain tube V11 is caused to be cut off in response to a pulse from the multivibrator pentode tube V3, a more positive potential is applied through conductor 23 to energize the tube V24 as well as to apply a positive pulse through conductor 24, rectifier 25 and condenser 26 to the grid of the tube V1 of the bistable trigger circuit, causing the tube V1 to become conductive again and the tube V2 to become non-conductive and to cut off the multivibrator through connection 21, indicating the end of one signal and correspondingly producing a stop element by the operation of transmitting relay A due to the deenergization of all of the odd numbered control tubes V13—V23 insured by the connection 20, previously described, which maintains the counting tube V5 conductive and correspondingly control tube V13 non-conductive.

The entire circuit has now been cut-off until the start switch S$t$1 is again closed. However, if the start switch S$t$1 remains or is again immediately closed, the cyclic operation of the circuit will continue. If desired, in the present system a separate cam wheel may be connected to the rotor shaft M to operate the switch S$t$1 at the end of each signal, to continue the operation of the motor and transmission of signals as long as signals appear on the tape P to be read or transmitted.

III—The tape reader

Referring now to Figs. 8$b$ and 3 there is schematically shown an embodiment of a reader for one longitudinal row of recorded signal elements or perforation positions, such as circle C$o$1, along the telegraph tape P. Since the tape P is moved a slight amount by means of the wheel W connected to the rotor R, each time another electromagnet in the stator is energized, the five feelers $v$, one for each longitudinal line or row of circles C$o$1—C$o$5, are arranged along a bias line across the tape indicated by the points $p$1—$p$5. Thus, as the tape moves in the direction of the arrow shown in Fig. 3, the ends of respective feelers $v$ at the points $p$1—$p$5 may be successively operated to detect the presence or absence of a perforation or hole in the region of the circles C$o$1—C$o$5, respectively.

Although the feeler $v$ shown in Fig. 8$b$ may be caused to ride against the surface of the tape P by the pressure of a spring so that its insertion into a hole in the tape will close the contacts to connect negative potentials to the corresponding one of the terminals T$o$1—T$o$5, it is more desirable to operate the separate feelers $v$ only during the time the points $p$1—$p$5 are centered over the circles Co1—Co5, so that the feelers will not wear or tear the tape P. Accordingly, there may be provided a group of five electromagnet devices, such as magnet *em* shown in Fig. 8b, each of which operates a pivoted lever armature *a''* to which a feeling finger *v* as well as one of the contacts *w* is connected. These armatures *a''* are normally maintained away from their electromagnets *em* by the action of springs 30, so that their feeling fingers *v* are normally out of contact with the surface of the tape P when their magnets *em* are not energized. Energization of a magnet *em* accordingly raises the finger *v* which moves it upwardly a sufficient distance to close the contacts *w*, if an aperture occurs in the tape at its corresponding circle position Co1 and point *p1*. If there is no aperture or holes in the tape at this position, the finger *v* is prevented from moving sufficiently to close the contacts *w*, indicating the other or opposite of the binary signal condition of the element at the time said magnet *em* is operated.

The sequential energization of the magnets *em* during detection positions of the circles Co1—Co5 over the feeler points *p1—p5*, may be effected by connecting the coil S1a of the magnet *em* in series with the coil of electromagnet S1 in the output of the control tube V12 as shown in Fig. 8a wherein terminals *a'* and *b'* corresponding to terminals *a'* and *b'* in Fig. 8b. In order to insure operation of the feeler finger *v* throughout the presence of the circle Co1 over the point *p1* corresponding to the first element of the signal to be transmitted, a second coil S1b may also be provided on the magnet *em* which is connected in series with the output of the control tube V14, so that the finger *v* will remain energized during two full steps of the tape P. Correspondingly the terminals *c'* and *d'* of the second coil S1b are shown in the output circuit of the tube V14 in Fig. 8a. Also, in the output tube V14 there may be provided the first coil S2a for energization of the next magnet *em* for operating the finger *v* in the circle position Co2 and point *p2*. Thus because of the slight movement of each step relative to the size of the circle positions Co1—Co5, during one step of the motor both fingers corresponding to positions *p1* and *p2* may be extended to detect the presence of their respective holes Co1 and Co2 in the tape (see Fig. 3).

Another reason for two coils on the magnets *em* is that the operation of the odd numbered control tubes V15, V17, V19, V21 and V23 must be counteracted during the whole time that one of the counting chain tubes may be deenergized, so that the more positive potential applied from the deenergization of a counting chain tube may be more than overcome in time by a negative potential, if it is applied, via the corresponding terminal To1—To5. Accordingly, to insure correct transmission of detected signals and prevent erroneous operation of the transmitting relay A due to shorter possible positive pulses, the duration of the operation of the detecting feelers *v* is prolonged for more than one step of the counting chain or code element interval by the addition of the second and holding coils on the magnets *em* in Fig. 8a.

Although a specific telegraph code reader mechanism is disclosed for controlling the operation of the synchronous motor and its electronic control circuit of this invention, other pulse trains and sequences may be employed for synchronizing the position of the motor with certain conditions by application of different potentials to the terminals To1—To5. Similarly, the entire control of the circuit may be only under the operation of the start switch Srl, whereby each time the switch is operated the motor works for one cycle of the counting chain. Accordingly, the principles of this invention need not be restricted to the specific adaptation of the synchronous motor for a five-unit telegraph code to be transmitted as a seven-unit sequential pulse code.

Therefore, while there is described above the principles of this invention in connection with specific apparatus, it is to be clearly understood that this description is made only by way of example and not as a limitation to the scope of this invention.

What is claimed is:

1. A synchronous motor control system comprising: a motor having a stator with a plurality of electromagnets and a rotor with a plurality of elements cooperable one at a time with said electromagnets, an electronic switching means for starting the energization of said electromagnets, and an electronic distributor circuit including means for separately and successively energizing each of said electromagnets once in a cycle in response to the operation of said switching means, and means controlled by said circuit for stopping said circuit at the end of its cycle and resetting said switching means for restarting said circuit.

2. A step-by-step motor and its control system comprising: a stator having a plurality of electromagnets with separate radially aligned equally circumferentially spaced poles, a rotor cooperating with said stator having a plurality of circumferentially equally spaced pole responsive elements, said poles and said elements having different pitches, an electronic counting chain for sequentially energizing said electromagnets in accordance with a predetermined sequence, electronic means for controlling one cycle of operation of said counting chain and separate means to start said electronic means after the end of each cycle of operation of said counting chain.

3. A synchronous motor control system comprising: an electric motor having a stator and a rotor, said stator comprising a plurality of spaced electromagnets, said rotor comprising a plurality of circumferentially equally spaced electromagnet responsive elements cooperable one at a time with only one of said electromagnets, an electronic distributor circuit for sequentially energizing said electromagnets according to a predetermined cyclic pattern for one cycle, and a switching means for starting and stopping said distributor circuit between each cycle of its operation.

4. A system according to claim 3 wherein said electronic distributor comprises a counting chain of electron discharge tubes.

5. A system according to claim 3 wherein said electronic distributor comprises a multivibrator circuit.

6. A system according to claim 3 wherein said switching means comprises a bistable trigger circuit.

7. A system according to claim 3 wherein said distributor circuit comprises a multivibrator circuit and a counting chain circuit synchronized by said multivibrator.

8. A system according to claim 7 wherein said means for starting and stopping said distributor circuit comprises a bistable trigger circuit which controls the operation of said multivibrator and is controlled by said counting chain at the end of its cycle.

9. A synchronous mechanism for operating a telegraphic tape reader and transmitter including a motor comprising: a stator for said motor having a plurality of separate electromagnets, a rotor for said motor having a plurality of electromagnet pole responsive elements arranged at a different pitch from that of said electromagnets, a tape feeder wheel connected to said rotor, a tape having separate binary elements of a signal code recorded thereon as perforations and the absence of perforations, a distributor circuit comprising a plurality of stages corresponding to the number of said electromagnets for controlling the energization of said electromagnets, means for successively operating each of said stages, a transmitter relay connected to all of said stages, means for detecting the presence of perforations according to each element of said code signal recorded on said tape, and means for operating said transmitting relay in accordance with said detecting means in sequence with the operation of said rotor for moving said tape.

10. A mechanism according to claim 9 wherein said means for detecting the presence of perforations includes means synchronized with said distributor circuit for successively operating said detecting means in synchronism with the operation of said rotor.

11. A mechanism according to claim 10 wherein said synchronized means comprises a separate electric magnet and a separate feeler operated thereby for each element of the telegraph code recorded on said tape.

12. A mechanism according to claim 11 wherein said feeler includes an electrical contact for controlling the operation of said transmitter relay.

13. In a signal tape keyer and transmitter mechanism for detecting and transmitting signal indications recorded on a punched tape in the form of a binary multi-element code, said mechanism comprising: a perforated tape, means for detecting the presence and absence of perforations on said tape, an electronic switching means, an electronic distributor having a counting chain having a number of successively operated stages corresponding to the number of elements in each code signal, a synchronous step-by-step motor having separate stator electromagnets corresponding with said same number of elements in each code signal, a toothed rotor for said motor the teeth of which cooperate one at a time with said electromagnets of said stator, a tape feeding wheel connected to said rotor to feed said tape in synchronism with the successive detection of elements in each signal recorded thereon, and means for transmitting each detected element as it is detected.

14. A mechanism according to claim 13 wherein said transmitting means includes a transmitter relay.

15. A mechanism according to claim 13 wherein said detecting means includes separate feelers for detecting the presence of perforations in said tape corresponding to each element of the code signal recorded in said tape.

16. A mechanism according to claim 13 wherein said distributor includes a multivibrator circuit for operating said counting chain.

17. A mechanism according to claim 15 including means for operating said feelers only during the time each element is being transmitted in synchronism with said motor and under the control of said counting chain.

18. A mechanism according to claim 17 wherein said means for operating said feelers includes means for operating said feelers during two adjacent motor moving steps.

References Cited in the file of this patent

UNITED STATES PATENTS

| | | |
|---|---|---|
| 1,353,025 | Chicken et al. | Sept. 14, 1920 |
| 1,945,511 | Bercot | Feb. 6, 1934 |
| 2,432,140 | Dehmel | Dec. 9, 1947 |
| 2,477,993 | Lewis | Aug. 2, 1949 |
| 2,579,231 | Goldberg et al. | Dec. 18, 1951 |
| 2,631,264 | Thomas | Mar. 10, 1953 |